Jan. 3, 1967    R. F. SHANNON    3,296,346
SLURRY POURING MEANS AND METHOD
Filed June 7, 1963    2 Sheets-Sheet 1
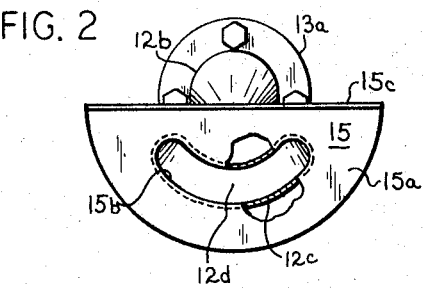
FIG. 2
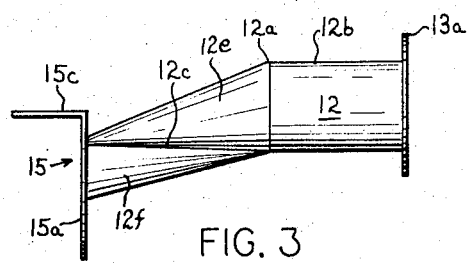
FIG. 3
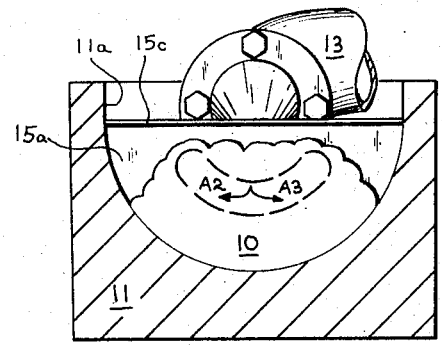
FIG. 5
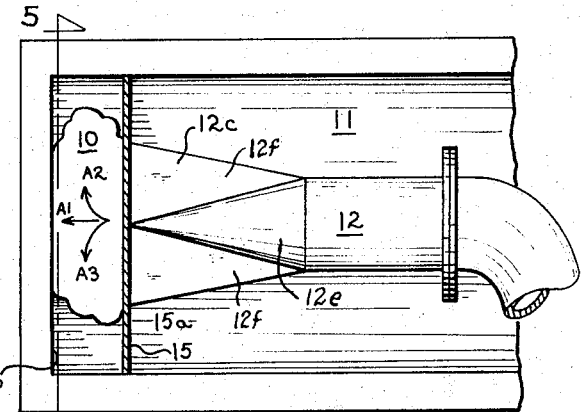
FIG. 4
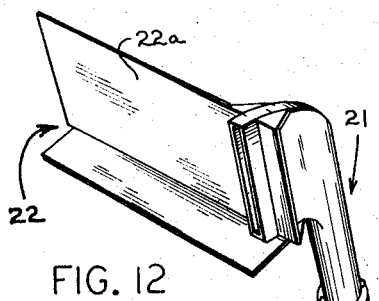
FIG. 12
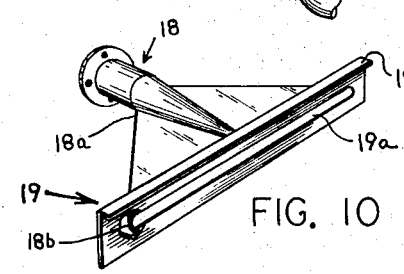
FIG. 10   FIG. 1
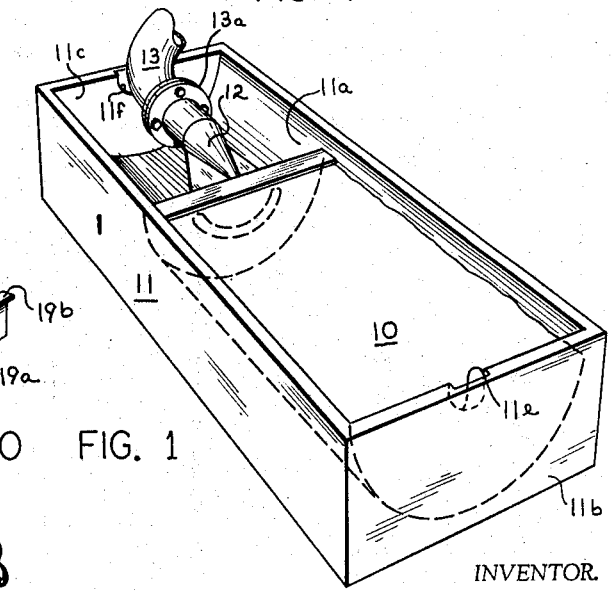
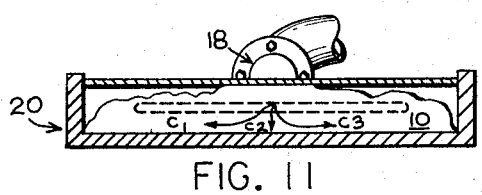
FIG. 11
INVENTOR.
RICHARD F. SHANNON
BY
Staehli & Overman
ATTORNEYS

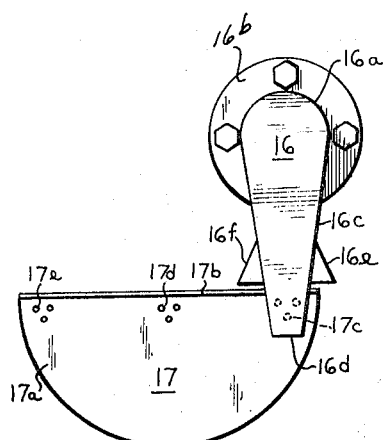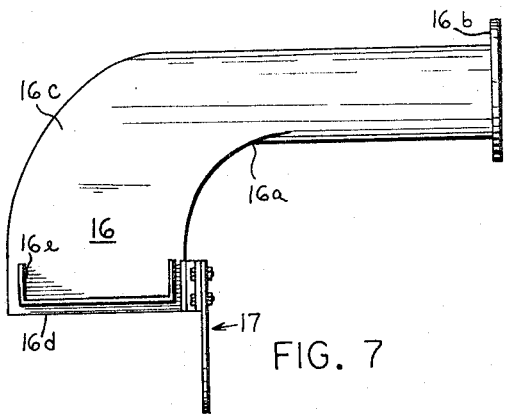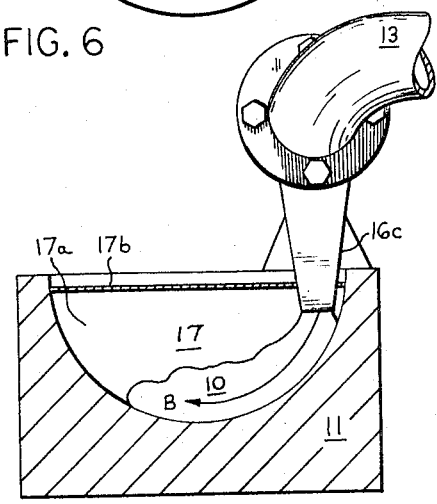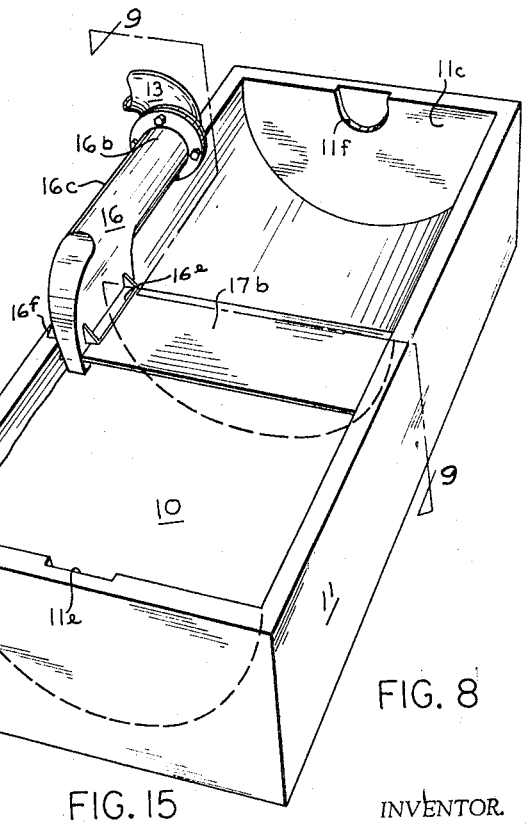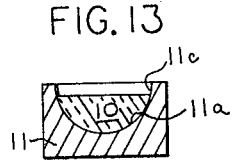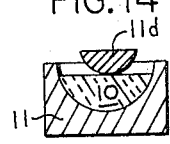

United States Patent Office 3,296,346
Patented Jan. 3, 1967

3,296,346
SLURRY POURING MEANS AND METHOD
Richard F. Shannon, Lancaster, Ohio, assignor to Owens-Corning Fiberglas Corporation, a corporation of Delaware
Filed June 7, 1963, Ser. No. 286,351
9 Claims. (Cl. 264—108)

The present invention relates generally to slurry pouring and more particularly concerns novel innovations in slurry pouring means and techniques of the type suitable for use in conjunction with in-situ molding processes wherein aqueous slurries of cementitious constituents are poured into molds and therein converted into self-supporting bodies of shaped or molded cementitious material.

Processes for molding shaped bodies of cementitious constituents utilizing in-situ molding techniques of the type referred to above are quite commonly employed in the commercial manufacture of light weight bodies of molded thermal insulation materials. Conventionally, such processes involve the initial preparation of an aqueous slurry of constituent reactive cementitious materials. For any given type of slurry of cementitious constituents the water to solids ratio is ordinarily variable throughout a wide range and is relied upon as a governing factor in determining the apparent density of the final product. The slurry preparation is then molded in-situ by being poured into cavity-type molds which are provided with molding surfaces conforming essentially to the dimensional and configurational characteristics of the mold. The slurry, while at least initially contained in the mold, is then converted or transformed in-situ from a fluid or semi-fluid condition to a shaped self-supporting body of material. The manner of in-situ conversion or transformation of the slurry constituents into a self-supporting or self-sustaining body of material may vary, depending upon the nature of the cementitious slurry constituents, and particularly the reactivity thereof, and depending as well as upon the degree of strength, heat resistance, density, durability, handleability and other characteristics necessary or desirable in the final product.

One method suitable for such conversion or transformation involves the use of heat. This manner of conversion or transformation is commonly promoted by subjecting the slurry to elevated temperatures and pressures mutually coordinated to prevent ebullition of the aqueous slurry medium. Once the conversion or transformation has progressed sufficiently to convert and harden the slurry constituents into an integrated self-supporting body of shaped material which is capable of being removed from the mold without impairment of the unity or shape of the material, the body of shaped material is ordinarily removed from the mold and dried to its final form or further hardened by additional exposure to elevated temperatures and pressures prior to drying. A process of the foregoing type for the preparation of shaped light weight insulation materials is set forth in more specific detail with respect to calcareous and siliceous types of cementitious materials in U.S. Patent No. 1,932,971, issued October 31, 1933, and U.S. Patent No. 2,665,996, issued January 12, 1954.

Another method commonly employed for in-situ conversion or transformation of reactive magnesic and siliceous types of cementitious materials is described with great particularity in U.S. Patent No. 2,609,733, issued September 9, 1952. According to this latter method, the cementitious slurry constituents are, after partial curing, substantially dewatered in suction-type filter mold, or compression mold, and thereafter indurated by exposure to heat which is first supplied from hot water followed by exposure to elevated temperatures in a drying oven.

In each of the above-described methods of in-situ molding of cementitious slurries, as well as other commonly known methods two numerous to describe, various types of fibrous constituents are frequently included in the slurry and function to reinforce and strengthen the ultimate product. Among the numerous types of fibrous constituents conventionally utilized for such purposes are straw, asbestos fibers, bagasse, glass fibers and the like. Irrespective of the method or slurry constituents utilized, however, the strength and insulating qualities of the ultimate product for any given process, composition and density is dependent in large measure upon the degree of homogeneity and integrality obtained in the final product. As a corollary, the degree of homogeneity and integrality of the final product is in turn a direct result of the degree of homogeneity and integrality possessed by the slurry immediately prior to and during the conversion or transformation of the slurry to an immobile, or self-sustaining physical condition. As otherwise stated, defects in the homogeneity and uniformity of the slurry which exist during the conversion or transformation phase appear as related defects adversely affecting the strength, unity, and insulating characteristics of the final product. Ordinarily, such slurry defects result prior to or during the course of pouring the slurry into the mold and become manifest in the form of slip planes, pouring folds, air pockets and non-uniform distribution of the slurry constituents and reinforcing fibers, all of which tend to inhibit the attainment of the potential and optimum physical properties desired in the final product. Another significant defective condition, or at least non-desirable condition, which ordinarily attends the formation of molded cementitious materials is the complete disarray and lack of proper orientation of the fibrous constituents of the slurry. Obviously, such disarray of the fibrous constituents tends to seriously decrease the potential or optimum strengthening effect of the fibers which would otherwise be obtainable if the fibers were predominantly oriented transversely with respect to the planes of weakness of the product. Additionally where a low coefficient of thermal conductivity is desired, such fiber disarray is quite detrimental since those fibers which are disposed depthwise of the product tend to act as thermal conductors aiding the flow of heat through the product.

Heretofore, during the mold filling stage of in-situ molding processes, ordinarily little concern has been relegated to the pouring or mold filling aspect, other than to ascertain that the requisite amount of slurry has been introduced into the mold. Commonly, the slurry is either pumped or fed by gravity from a slurry mixing chamber through a flexible hose, chute, or similar device, and thereby directed into the mold which is to be filled. As the slurry issues from the pouring device, it flows into the mold substantially unrestricted, except for the confining walls of the mold. Thereafter, the slurry spreads out into a laminar stream within the mold and fills the mold in an indiscriminate and fortuitous manner. However, since cemetitious slurries are commonly thick and plastic or semi-plastic in character, the laminar stream of slurry overlaps and courses over other portions of the slurry in various zones within the mold and produces interfacial defects such as pouring folds, air pockets and interfacial slip planes. Similar results develop when the pouring device is directed from one portion of the mold cavity to another during the filling or pouring operation since such redirectioning gives rise to a layered build up of the slurry within the mold with insufficient physical intermixing of the layers or overlapping streams of slurry.

The aforementioned mold filling or pouring methods also provide little, if any, desirable orientation of the fibrous constituents of the slurry. More particularly, the most effective hinging strength, impact strength and modulus of rupture are obtainable by uniformly distributing and orienting the fibrous constituents in such manner that the fibrous constituents are predominantly arranged transversely of the thickness of the product or, alternatively stated, in generally parallel relationship with the major surfaces of the final product. In this manner, the reinforcing fibers provide greatest resistance to cracking, fracturing and separation of the final product since the reinforcing fibers are predominantly distributed and arrayed transversely to the planes of stress accompanying bending and impact forces to which the final product may be subjected during use. Additionally, where the cementitious material is intended for ultimate use as an insulation material, the predominant orientation of the fibrous constituents in planes situated transverse to the path or direction of heat flow through the body of material is extremely important in obtaining enhanced insulating characteristics, since the thermal conductivity of the fibers ordinarily is greater than that of the body of material in which they are embedded. Thus, the tendency of the fibers to act as thermal conductors when situated or arranged lengthwise through the thickness of the material is effectively suppressed. By conventional pouring techniques, however, predominant fiber distribution and lengthwise orientation in the more desirable planes of the final product is practically incapable of any uniform or prediscernible attainment. Consequently, in order to achieve the requisite strength in the product, excesive quantities of reinforcing fibers must be utilized. As an attendant result, more fibers are disposed lengthwise through the thickness of the material and the overall K-factor of the material is increased to the detriment of the insulating value of the product.

Accordingly, it is an object of the present invention to provide means for improving the quality of molded cementitious materials prepared by in-situ slurry molding techniques.

Another object of the present invention is to provide an improved method and means for pouring a cementitious slurry into a mold.

Another object of the present invention is to provide a method and means for pouring a slurry of cementitious materials into a mold which accomplishes such pouring in the manner tending to obviate the formation of pouring folds, slip planes, air pockets and other pouring defects.

An additional object of the present invention is to provide a method and apparatus for pouring a slurry of cementitious and fibrous constituents into a mold in such manner that the fibrous constituents are predominantly oriented and distributed in a predetermined arrangement within the mold concurrently with the pouring of the slurry.

A further objective of the present invention is to provide a method and means of improving the strength of products prepared from slurries of cementitious materials.

A still further objective of the present invention is to provide a method and means for pouring a slurry of cementitious materials into a mold in such manner that slurry movement and flow in the mold during the pouring operation is restricted and confined to the immediate area wherein the slurry is discharged into the mold.

A still further objective of the present invention is to provide a pouring device suitable for use with a fibrous slurry and which tends to orient predominant quantities of the fibrous constituents in a predetermined pattern while the slurry is being poured.

A still further objective of the present invention is to provide apparatus suitable for pouring cementitious materials into a mold in such manner that the pouring apparatus cooperates with the interior molding surfaces of the mold and forms a partition within the mold which is progressively shiftable from one end of the mold to an opposite thereof and permits complete filling of progressively adjacent areas of the mold.

A still further objective of the present invention is the provision of pouring means adapted for pouring a cementitious slurry into a cavity mold and having a pouring or discharge opening therein accompanied by a shiftable walled section which is snugly nestable within the cavity mold and is axially shiftable between the mold end walls to define a variable slurry chamber or pocket within the cavity mold.

Other objects, as well as aspects and advantages of the present invention, together with the specific nature thereof, will become apparent from the following detailed description wherein, by way of example only, several preferred embodiments of the invention are described in specific detail.

In accordance with the general concepts and embodiments, hereinafter to be described in greater detail, the aforementioned disadvantages resulting from pouring defects and deficient fiber alignment and orientation incurred in conventional in-situ types of molding of cementitious slurries may be effectively obviated. The avoidance of such pouring defects and lack of fiber orientation is effected by providing improved pouring means which, concurrently with the discharge of the slurry from the pouring means into the mold, is adapted to promote homogeneity and uniformity of the slurry and to pre-orient such fibrous constituents as may be included in the slurry. Additionally the pouring means herein is adapted to retain and further implement such homogeneity, uniformity and fiber orientation as the slurry progresses to fill the mold.

In general, the apparatus and methods of the present invention effectively overcome the commonly occurring pouring defects, such as non-uniformity and integrity of the final product, air-holes, pouring folds, silp planes, and poor fiber orientation, incurred in molding processes involving in-situ molding of cementitious slurries. Briefly, the pouring apparatus, in each of the various embodiments to be described, includes a pouring nozzle comprising slurry discharge tube with one axial end adapted for connection to a pouring hose, chute or the like from which slurry may be received from a mixing tank, storage hopper, or the like. At the opposite end, the discharge tube defines a constricted discharge orifice and carries a walled section which is provided with a contoured edge surface shaped to nest in snug slidable relationship within and span the interior confines of the mold into which the slurry is to be poured. In this manner, the walled section of the pouring nozzle conveniently forms a slidable partition which is movable within the mold cavity between opposite sides or ends of the mold to form a slurry confining chamber within the mold of selectively variable volumetric capacity.

Preferably, the discharge tube also defines an axially convergent section progressing towards the discharge end which tends to constrict the slurry within the discharge tube prior to and concurrent with the emergence of the slurry from the pouring nozzle into the mold. The functional effect of the restriction of the slurry is such that a gentle kneading action is imparted to the slurry. Thus the slurry is reconsolidated into a more uniform and homogeneous condition in which entrapped air, pouring folds, slip planes and other commonly occurring pouring defects originating during the previous mixing or pouring movement are dispersed and dispelled from the slurry when it emerges from the pouring nozzle. Furthermore, the axially convergent configuration of the discharge tube tends to deploy and pre-orient the fibrous slurry constituents so that they are disposed lengthwise of the flow of the slurry as the latter issues from the discharge tube into the mold. Consequently the slurry emerges from the pouring nozzle as a uniform and continuous mass or stream in which the fibrous constituents are predominantly aligned or oriented lengthwise of the path of flow of the slurry.

The improved slurry uniformity and homogeneity, as well as fiber orientation, effected by the pouring nozzle are maintained within the mold by the walled section of the discharge tube which nests snugly within the interior confines of the cavity mold for shiftable movement therein as the pouring nozzle is gradually moved from one end of the mold to the other during the mold filling operation. In manner of accomplishment, the filling of a mold is commenced with the walled section of the pouring tube nested within the mold at a location abutting or proximately abutting relationship with one end of the mold. As the slurry issues or is discharged through the discharge end of the pouring nozzle, it is confined or restricted to that portion or segment of the mold cavity immediately adjacent to the end wall of the mold until the mold is filled to a predetermined level. By concurrently shifting the nested walled section gradually through the length of the mold in coordinated relationship with the filling of the mold, and so that the predetermined slurry level is continuously maintained within the mold, the slurry which emerges from the pouring nozzle is confined and restricted to a closely contained area and thereby prevented from flowing in random fashion within the mold so as to inhibit the formation or reoccurrence of objectionable pouring defects.

In molding tubular shapes, such as are commonly utilized for insulating steam pipes and the like, the cementitious materials are commonly molded in semi-cylindrical sections. Molds typically employed for such purposes define elongated semi-circular molding surfaces and accommodate an elongated core which may be removably positioned and seated in co-axial alignment with the interior molding surfaces to define an annular semi-circular molding cavity. According to the present invention the core is positioned in the mold after it has been filled to a desired level with slurry. As the core is seated in the mold, the slurry, of course, being at least semi-fluid in nature, is displaced uniformly upward in the mold and, as will be subsequently described, aids in orienting the fibrous constituents in the desired manner within the mold, all of which is more clearly depicted in the accompanying drawings, wherein:

FIG. 1 is a perspective view depicting one preferred embodiment of the present invention and showing the functional aspect thereof in conjunction with a cavity mold of the type suitable for use in forming semi-cylindrical bodies of cementitious insulation material;

FIG. 2 is a front elevational view of the pouring nozzle characterized in the embodiment of the invention shown in FIG. 1;

FIG. 3 is a side elevational view of the pouring nozzle illustrated in FIG. 2;

FIG. 4 is a plan view of the pouring nozzle of FIGS. 1–3, and depicting the pouring nozzle in conjunction with a cavity mold during the early stages of the pouring and mold filling operation;

FIG. 5 is a sectional view taken substantially along the plane of the line 5—5 in FIG. 4;

FIG. 6 is a perspective view of another type of pouring nozzle embodying the invention herein;

FIG. 7 is a side elevational view of the embodiment represented in FIG. 6;

FIG. 8 is a perspective view of the embodiment illustrated in FIGS. 6 and 7, and depicting the functional aspect thereof during the mold filling operation;

FIG. 9 is a sectional view taken along the plane of the line 9—9 in FIG. 8;

FIG. 10 is a perspective view illustrating a modification of the pouring nozzle represented in FIGS. 1–5;

FIG. 11 is a sectional front elevational view of a mold being filled with a modified form of pouring nozzle illustrated in FIG. 10;

FIG. 12 is a perspective view illustrating a modification of the pouring nozzle illustrated in FIGS. 6–9;

FIGS. 13–15 are schematic sectional views of a mold of the type shown in FIGS. 1 and 11 depicting the functional affect of another aspect of this invention.

In accordance with conventional procedures, the slurry is first prepared in a suitable mixing chamber or hopper which may partake of the manner of preparation set forth in the previously mentioned U.S. Patents Nos. 1,932,971, 2,665,996 and 2,609,733, among others.

As illustrated in FIG. 1, the prepared cementitious slurry 10 is discharged into a cavity-type mold 11 from a pouring nozzle 12 which is suitably connected to the discharge end of a flexible hose or conduit 13 which transfers and supplies the slurry from the mixing or storage chamber, not shown.

In the form illustrated in FIG. 1, the mold 11 is of elongated, generally rectangular construction and defines a substantially semi-circular interior molding surface 11a extending lengthwise of the mold between closed opposite mold end walls 11b and 11c.

As depicted in one preferable aspect of the invention, the pouring nozzle 12 includes a hollow central body portion or pouring tube 12a which has an inlet end adapted for axial connection to the discharge end of the flexible hose 13, as by mating flanges, indicated generally at 13a, or other suitable means, provided on the interconnecting ends of the hose 13 and nozzle 12. The pouring tube 12a is formed with a generally cylindrical inlet end portion 12b and progressively flattens out towards the opposite axial end, or discharge end 12c, to define, as best shown in FIG. 2, a generally arcuate, semi-annular, or crescent-shaped discharge orifice 12d which conforms concentrically to the arcuate shape of the interior molding surface 11a of mold 11. Intermediate the inlet end portion 12b and the discharge end 12c, the pouring tube as best shown in FIGS. 3 and 4, is shaped in such manner as to form a semi-conically shaped medial portion 12e converging towards the discharge end 12c and merging laterally into an arcuate laterally disposed fan tail section 12f terminally defining the discharge orifice 12d. Functionally, the fan tail design of the pouring nozzle 12 tends to constrict and flatten out the stream of slurry as it passes through the nozzle. Such action, together with the relatively increased frictional resistance between the interior surfaces of the pouring nozzle 12 and the slurry 10, tends to align and orient the fibrous constituents predominantly in lengthwise relationship to the slurry flow. Also, the constricting action and the increased frictional resistance of the pouring nozzle impart substantial kneading and intermixing of the slurry constituents resulting in a substantial dissipation of pouring folds, slip planes, air pockets, and the like, which may be present in the slurry.

A transverse walled section 15 is also preferably carried by or mounted on the pouring nozzle 12 and may be positioned on the discharge end 12c thereof. As shown in FIG. 3, the walled section 15 generally resembles an inverted L-shaped configuration in side elevational aspect and includes a slurry retaining wall 15a, which is adapted to span the mold cavity and form, as best shown in FIG. 1, a partition within the mold intermediate the mold end walls 11b and 11c. More particularly, the slurry retaining wall 15a is adapted to function as a slidable retaining partition when nested within mold 11. Further, in this respect the retaining wall 15a is peripherally shaped to conform snugly to the arcuate interior molding surface 11a while being axially shiftable within the mold in such manner as to selectively vary the volumetric capacity of that portion or segment of the mold cavity in which the slurry is being discharged from the pouring nozzle during the progress of the mold pouring and filling operation. To permit passage of the slurry from the discharge end 12c of the pouring nozzle 12, the walled section 15 is provided with and defines an arcuately shaped medial opening 15b corresponding to and aligned in matching communicating relationship with the pouring tube discharge orifice 12d. In addition to the slurry retaining wall 15a, the walled section 15 is also preferably provided with a forwardly projecting marginal extension 15c, in the form of a canopy which extends normally from the upper edge of the retaining wall 15a to overlie the slurry as the latter is discharged from the pouring nozzle 12. The marginal extension 15c of the walled section 15 provides a convenient means for leveling and screeding the surface of the slurry 10 when the latter has filled the slurry chamber defined between the retaining wall 15a and the mold end wall 11b.

Utilizing the foregoing embodiment of the invention, the pouring nozzle 12 is introduced into the mold 11 with the walled section 15 of the pouring tube 12a located initially in abutting or proximately abutting relationship with mold end wall 11b, substantially as shown in FIG. 4. The slurry 10 is then discharged from the pouring nozzle 12 into the mold 11 wherein the discharged slurry is restrained and confined within the limited section or chamber defined between the slurry retaining wall 15a and the mold end wall 11b until the mold is filled to the desired level. The pouring nozzle 12 and accompanying walled section 15 are then progressively withdrawn towards the opposite end wall 11c of the mold. The movement of the pouring nozzle 12 and walled section 15 is coordinated with the rate of slurry discharge in such manner that the slurry is continuously maintained at a substantially fixed level corresponding to the height of the marginal extension 15c of the walled section 15. Thus, the marginal extension 15c may function as a guide with which to maintain the desired slurry level and additionally serve as a screed with which to smooth and level the upper surface of the slurry 10.

The retention of the slurry in close confinement within the mold 11 causes the slurry to be squeezed sufficiently to govern the direction and pattern of slurry flow and movement as the slurry emerges into the mold from the pouring nozzle 12. As best shown in FIGS. 4 and 5, the slurry upon emergence from the pouring nozzle 12 is forced to flow in an axially and a laterally disposed pattern, in the manner indicated by the directional arrows $A^1$, $A^2$, and $A^3$. Thus, the fibrous constituents, having been previously oriented and disposed lengthwise of the slurry flow while within the pouring nozzle, follow the path of slurry movement and are aligned and oriented in axially and laterally disposed planes generally paralleling the interior molding surface 11c of the mold 11. By orienting the fibers predominantly in this manner, and also thereby lessening the extent of fibers disposed depthwise of the slurry, the fiber strengthening potential is effectively increased and the thermal conductivity of the resultant material is substantially reduced.

As represented in FIGS. 6-9, the concepts of this invention may also be embodied in a pouring nozzle which is adapted to overlie and permit side filling of the mold 11. As illustrated in FIG. 6, the slurry as it is discharged into the mold 11 tends to flow in a path corresponding generally to that indicated by the directional arrow B in FIG. 9. The fibrous constituents are thereby predominantly concentrated lengthwise in a concentrically disposed array about the longitudinal axis of the mold 11 and the resultant molded material.

As further shown in FIG. 6, the pouring nozzle 16, comprises a pouring tube 16a having a generally cylindrical and flanged inlet end 16b suitable for attachment to a flexible hose 13, or the like, from which to receive a supply of slurry. At the opposite end, the pouring tube 16a defines a flattened radially disposed discharge end 16c defining a generally rectangular discharge opening, or discharge orifice 16d. Disposed outwardly from opposite sides of the discharge end 16c are a pair of guides 16e and 16f which are arranged to slide along the upper edge surface of the mold 11 as the pouring nozzle 16 travels from one end 11b to the other end 11c of the mold during the pouring operation.

As with the pouring nozzle construction previously discussed and depicted in FIGS. 1-5, the pouring nozzle 16 is also preferably provided with and carries a walled section 17 which may be bolted or otherwise removably mounted on the pouring tube 16a, as shown at 17c. The walled section 17 includes a depending wall portion 17a which is peripherally shaped to coincide with the transverse arcuate interior configuration of the mold 11 and which is adapted to form a barrier or partition intermediate the end walls of the mold 11 during the pouring operation. To smooth and level the upper surface of the poured slurry when it has attained the desired level, the walled section 17 preferably also includes a screed plate 17b which extends laterally from the upper edge of the wall portion 17a. Where so desired, the pouring nozzle 16 can be shifted relative to the mold side walls from a side pouring position to a central or other pouring position, if desired, by attaching the pouring nozzle at other mounting positions afforded on the walled section, as at 17d and 17e.

As contrasted with the foregoing embodiments which, by virtue of the arcuate peripheral configuration of the walled section, are particularly adapted for employment in molding semi-tubular bodies, the embodiments shown in FIGS. 10-12 are more suitable for use in molding slabs, blocks and similar rectangularly shaped bodies. For example, the pouring nozzle 18 shown in FIGS. 10 and 11 is generally similar to the pouring nozzle shown in FIGS. 1-5. To effect a proper functional relationship with a rectangular mold cavity, however, pouring nozzle 18, the walled section 19, the pouring tube 18a, and the discharge orifice 19a are of slightly modified design. As illustrated, the walled section 19 defines a generally rectangular peripheral configuration which is shaped, as shown in FIG. 10, to nest and slidably seat within a rectangular molding cavity defined in mold 20. Likewise, the medial discharge orifice 19a and the discharge end 18b of the pouring tube 18a are generally rectangular in design. As indicated by the directional arrows $C^1$, $C^2$ and $C^3$ in FIG. 11, the movement of the slurry as it emerges from the discharge orifice 19a is both forward and sideways and in such manner that the fibers tend to predominantly orient lengthwise in planes parallel to the upper and lower faces of the resultant slab or block of cementitious material.

In the embodiment depicted in FIG. 12, the pouring nozzle 21 corresponds generally to the pouring nozzle depicted in FIGS. 6-9, except that the walled section 22 is rectangular in shape for employment with a rectangular cavity mold, such as the mold 20 referred to previously with respect to FIG. 11.

Preferably, the walled section of both the pouring nozzle 18 and the pouring nozzle 21, have a screed such as 19b and 22a, respectively, illustrated in FIGS. 10 and 12, which may serve to smooth and level the upper surface of the poured slurry and additionally function as a visual depth guage in pouring the slurry to the desired depth in the mold. Also, it will be observed that the pouring nozzle 21, like each of the other foregoing nozzle structures, has a progressively flattening and widening tubular body portion which flattens towards the discharge end thereof.

As illustrated in FIGS. 1-9, it has been found to be preferable in the formation of semi-tubular shapes, to pour the slurry into molds, such as mold 11, with the axial mold core removed, and to place the core into position within the mold upon completion of the pouring of the slurry. This aspect is diagrammatically represented in FIGS. 13-15. As shown in FIG. 13, the pouring nozzle, such as either pouring nozzle, 12 or 16, is removed when the mold 11 is filled to the desired level. Thereafter, an axially elongated mold core 11d is depressed into the slurry 10 and seated in concentric position within the mold. Suitable alignment and seating of the core 11d may be accomplished in conventional manner by providing core aligning and supporting means at each end of the mold. One form of such means is shown in FIGS. 1 and 8, wherein guide slots or grooves such as 11e and 11f are provided in the interior surface of the opposite end walls 11b and 11c of the mold 11. The depression of the mold core 11d into the slurry 10 causes the slurry to be displaced upwardly and outwardly throughout the length of the mold 11 in the general manner and direction shown by the directional arrows in FIG. 15. This manner of displacement of the slurry 10 further supplements the desired orientation of the fibrous constituents of the slurry obtained by pre-orientation in the pouring nozzle and during the filling of the mold by causing the fibrous constituents to be urged, as a consequence of the upward and outward slurry movement, into lengthwise concentric disposition generally following the arcuate contour of the molding surfaces of mold and core. Residual slurry flowing over the edges of the mold as at 10a and 10b may easily be removed immediately after the core is positioned or by a trimming operation performed after the slurry has been molded.

Irrespective of which of the foregoing methods and apparatus is employed in the in-situ molding of cementitious slurries, it has been found that the resultant molded product exhibits highly desirable and improved characteristics, among others, of strength, insulating value and appearance. The molded product possesses substantially fewer pouring defects, such as slip planes, pouring folds, non-homogeniety, air-holes and the like, than is ordinarily obtainable with conventional pouring techniques and apparatus.

Further, by virtue of the foregoing methods and apparatus, it is possible to regulate, to a predominant degree, the alignment of the fibrous constituents of the slurry in such manner in the mold that optimum orientation of the fibers is regularly achieved. In this respect, the fibrous constituents are predominantly situated in planar relationship with the molded faces of the ultimate product. Otherwise stated, the amount of fibers displaced depthwise of the product is substantially minimized. Consequently, the impact strength, modulus of rupture, and hinging strength of the product are substantially enhanced, while at the same time the coefficient of thermal conductivity of the product is perceptibly reduced. Another significant aspect of the invention is that substantial variability in the planar orientation of the fibrous constituents is obtainable. For example, the relative planar disposition of the fibrous constituents can be varied by varying the width of the discharge opening in the pouring nozzle and by suitable variation in the type of pouring nozzle employed. In this regard the pouring nozzles depicted in FIGS. 1 and 10 tend to provide a greater degree of orientation paralleling the path of movement of the pouring nozzles shown in FIGS. 8 and 12 tend to predominantly align the fibrous constituents transversely of the path of movement of the pouring nozzle. In each event however, the alignment is predominantly arranged parallel to the molded face or faces of the resultant product.

Having now described the foregoing invention in substantial detail, it will, of course, be understood that various details of construction herein described may be modified throughout a wide range of equivalents and that the various steps in the method herein taught may be performed while using any number of the different structures disclosed, or, in fact, without the use of any particular structure whatsoever, without departing from the principles of this invention, and it is, therefore, not the purpose to limit the invention herein otherwise than as necessitated by the scope of the appended claims.

I claim:
1. In combination with a cavity-type mold provided with closed end walls and side walls defining a mold cavity having a substantially uniform upwardly opening and generally U-shaped transverse internal configuration, a manually manipulatable slurry pouring nozzle for filling the mold cavity with a cementitious slurry, said pouring nozzle comprising a tubular body portion defining an inlet opening for receiving a flow of slurry from a flexible slurry supply line and having a progressively flattening and widening discharge end formed with a convergent end portion defining an oblong discharge orifice substantially conforming in shape to the transverse bottom surface configuration of the mold cavity and in communicating relationship through said tubular body portion with said inlet opening, said discharge end being shaped to partially restrict the slurry during the passage thereof through said discharge end and said discharge orifice, a walled section defining an inverted L-shaped configuration carried by said pouring means adjacent to said discharge orifice and arranged to nest within and form a partition wall extending transversely across the mold cavity, and said walled section being shiftable lengthwise of the mold cavity while retained in such nested position in response to accommodating manually imparted shifting movements of said pouring means along a linear path extending between the closed end walls of said mold.

2. The combination defined in claim 1, wherein said convergent end portion of said pouring means is shaped to define a rectangular discharge orifice.

3. The combination defined in claim 1, wherein said walled section defines a peripheral semi-circular configuration and the interior wall surface of said mold cavity defines a conforming transverse semi-circular configuration.

4. The combination defined in claim 1, wherein said discharge end is provided with a fan tail shaped convergent end portion.

5. In combination with a cavity-type mold provided with closed end walls and side walls defining a mold cavity having substantially uniform upwardly opening and generally U-shaped transverse internal configuration extending through the length of the mold cavity, slurry pouring means for filling the mold cavity with a cementitious slurry, said slurry pouring means comprising a tubular body portion defining an inlet opening for receiving a flow of slurry and having a progressively flattening and widening discharge end defining an oblong discharge orifice in communicating relationship through said tubular body portion with said inlet opening whereby to partially restrict the slurry during the passage thereof through said discharge end and said discharge orifice, a walled section carried by said pouring means and shaped to be received through the upwardly opening portion of said cavity-type mold and arranged to nest within said mold cavity, said walled portion having a slurry retaining wall shaped to form a partition wall extending transversely across the mold cavity and having a screed portion disposed outwardly from the upper end of said slurry retaining wall and overlying said mold cavity at a height corresponding to the slurry level of the mold, and said walled section being shiftable lengthwise of the mold cavity while retained in such nested position in response to accommodating shifting movements of said pouring means along a path extending between the closed end walls of said mold.

6. Slurry pouring means in accordance with claim 5, wherein said discharge end is provided with a fan tail shaped convergent end portion.

7. Slurry pouring means in accordance with claim 5, wherein said convergent end portion of said pouring means is shaped to define a rectangular discharge orifice.

8. Slurry pouring means in accordance with claim 5, wherein said convergent end portion of said pouring means is shaped to define a semi-annular discharge orifice.

9. A method of filling with a slurry of cementitious and fibrous constituents a cavity-type mold provided with closed end walls and side walls defining a mold cavity having a substantially uniform upwardly opening and generally U-shaped transverse internal configuration comprising the steps of passing the slurry through a convergent partially restricted path to orient the fibrous slurry constituents lengthwise of the slurry flow, depositing the oriented fibrous slurry within a cavity mold as the slurry emerges from said partially restricted path and concurrently restricting the flow of the emergent slurry within the confines of said mold to a minor incremental region of the mold cavity and to flow paths predominantly paralleling the bottom surface configuration of said mold cavity without disorienting the lengthwise relative orientation of the major portion of said fibrous slurry constituents and until said minor incremental region is filled to a predetermined depth, and progressively filling successively adjacent minor incremental regions of said mold cavity to the same predetermined depth along a path extending between said closed end walls and throughout the end to end expanse of said mold cavity.

References Cited by the Examiner

UNITED STATES PATENTS

| | | | |
|---|---|---|---|
| 1,700,208 | 1/1929 | Paisseau | 18—12 |
| 2,122,703 | 7/1938 | Weinreich | 18—12 XR |
| 2,168,288 | 8/1939 | Fischer | 18—12 XR |
| 2,280,022 | 4/1942 | Banigan et al. | 264—108 |
| 2,465,204 | 3/1949 | Dalton | 18—30 |
| 2,716,070 | 4/1955 | Seipt | 264—108 |
| 2,834,051 | 5/1958 | Rekettye | 18—30 |
| 3,168,509 | 2/1965 | Juel | 264—108 |
| 3,175,477 | 3/1965 | Cheney | 25—32 XR |

ALEXANDER H. BRODMERKEL, *Primary Examiner.*

J. H. WOO, *Assistant Examiner.*